(12) United States Patent
Sathe et al.

(10) Patent No.: US 8,975,936 B2
(45) Date of Patent: Mar. 10, 2015

(54) CONSTRAINING CLOCK SKEW IN A RESONANT CLOCKED SYSTEM

(75) Inventors: Visvesh S. Sathe, Fort Collins, CO (US); Samuel D. Naffziger, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/601,119

(22) Filed: Aug. 31, 2012

(65) Prior Publication Data
US 2014/0062562 A1 Mar. 6, 2014

(51) Int. Cl.
G06F 1/04 (2006.01)
H03K 3/00 (2006.01)

(52) U.S. Cl.
USPC ............... 327/291; 331/46; 331/167; 331/55; 327/294; 327/297

(58) Field of Classification Search
USPC .......................................... 327/291
See application file for complete search history.

(56) References Cited

U.S. PATENT DOCUMENTS

| | | | | |
|---|---|---|---|---|
| 6,205,571 B1* | 3/2001 | Camporese et al. | ......... | 716/114 |
| 6,310,499 B1 | 10/2001 | Radjassamy | | |
| 7,082,580 B2* | 7/2006 | Zarkesh-Ha et al. | ......... | 716/138 |
| 7,084,685 B2 | 8/2006 | Lin et al. | | |
| 7,237,217 B2* | 6/2007 | Restle | ........................... | 327/291 |
| 7,702,944 B2* | 4/2010 | Chelstrom et al. | ............ | 713/500 |
| 8,339,209 B2* | 12/2012 | Papaefthymiou et al. | .... | 331/117 |
| 8,362,811 B2* | 1/2013 | Papaefthymiou et al. | .... | 327/108 |
| 8,368,450 B2* | 2/2013 | Papaefthymiou et al. | .... | 327/291 |
| 8,400,192 B2* | 3/2013 | Papaefthymiou et al. | .... | 327/108 |
| 8,502,569 B2* | 8/2013 | Papaefthymiou et al. | .... | 327/108 |
| 2004/0158758 A1* | 8/2004 | Zarkesh-Ha et al. | ......... | 713/500 |
| 2005/0057286 A1* | 3/2005 | Shepard et al. | ............... | 327/141 |
| 2005/0114820 A1* | 5/2005 | Restle | ............. | 716/13 |
| 2008/0303576 A1* | 12/2008 | Chueh et al. | ................... | 327/299 |
| 2009/0027085 A1* | 1/2009 | Ishii et al. | ........................ | 326/93 |
| 2011/0084736 A1 | 4/2011 | Papaefthymiou et al. | | |
| 2011/0084772 A1* | 4/2011 | Papaefthymiou et al. | .... | 331/117 |
| 2011/0084773 A1 | 4/2011 | Papaefthymiou et al. | | |
| 2011/0084774 A1 | 4/2011 | Papaefthymiou et al. | | |
| 2011/0084775 A1 | 4/2011 | Papaefthymiou et al. | | |
| 2011/0090018 A1 | 4/2011 | Papaefthymiou et al. | | |
| 2011/0090019 A1 | 4/2011 | Papaefthymiou et al. | | |
| 2011/0140753 A1* | 6/2011 | Papaefthymiou et al. | .... | 327/291 |
| 2013/0049824 A1* | 2/2013 | Kim et al. | ...................... | 327/141 |
| 2013/0154727 A1* | 6/2013 | Guthaus | ........................ | 327/565 |
| 2013/0194018 A1* | 8/2013 | Papaefthymiou et al. | .... | 327/291 |

OTHER PUBLICATIONS

U.S. Appl. No. 13/601,188, filed Aug. 31, 2012, entitled "Clock Driver for Frequency Scalable Systems," naming inventors Visvesh S. Sathe et al.
U.S. Appl. No. 13/601,175, filed Aug. 31, 2012, entitled "Programmable Clock Driver," naming inventors Visvesh S. Sathe et al.

(Continued)

*Primary Examiner* — Ryan Jager
(74) *Attorney, Agent, or Firm* — Abel Law Group, LLP

(57) ABSTRACT

An integrated circuit includes a plurality of resonant clock domains of a resonant clock network. Each resonant clock domain has at least one clock driver that supplies a portion of clock signal to an associated resonant clock domain. The resonant clock network operates in a resonant mode with inductors connected to pairs of resonant clock domains at boundaries between the resonant clock domains. Each inductor forms an LC circuit with clock load capacitance in the pair of resonant clock domains to which the inductor is connected.

25 Claims, 3 Drawing Sheets

(56) References Cited

OTHER PUBLICATIONS

U.S. Appl. No. 13/601,155, filed Aug. 31, 2012, entitled "Controlling Impedance of a Switch Using High Impedance Voltage Sources to Provide More Efficient Clocking," naming inventors Visvesh S. Sathe and Samuel Naffziger.

U.S. Appl. No. 13/601,138, filed Aug. 31, 2012, entitled "Transitioning from Resonant Clocking Mode to Conventional Clocking Mode," naming inventors Visvesh S. Sathe and Samuel Naffziger.

* cited by examiner

CONSTRAINING CLOCK SKEW IN A RESONANT CLOCKED SYSTEM

BACKGROUND

1. Technical Field

The disclosed embodiments relate to resonant clock networks and more particularly to inductors that form part of the resonant clock network.

2. Description of the Related Art

Clock distribution networks account for a significant portion of overall power consumption in most high performance digital circuits today due to the parasitic capacitance that is connected to the clock network. One promising technique to implement a more energy-efficient clock distribution is resonant clocking. However, a resonant clocking circuit requires an inductor (L) with an instantiated capacitor (C) or parasitic capacitance of the clock network to form an LC circuit. Improvements in resonant clocking can help improve the clock network.

SUMMARY OF EMBODIMENTS

Accordingly, in one embodiment an integrated circuit includes a first resonant clock domain of a resonant clock network coupled to a second resonant clock domain of the resonant clock network by a clock mesh branch. A clock driver is associated with the first resonant clock domain. An inductor connects to the clock mesh branch at a boundary between the first resonant clock domain and the second resonant clock domain.

In some embodiments a method includes supplying a first portion of a clock signal to circuits of a first resonant clock domain of a resonant clock network and circuits of a second resonant clock domain of the resonant clock network from an inductor connected at a boundary between the first resonant clock domain and the second resonant clock domain.

In some embodiments an integrated circuit includes a plurality of resonant clock domains of a resonant clock network. Respective clock drivers are associated with respective ones of the resonant clock domains, each clock driver supplying a clock signal to an associated resonant clock domain of the respective resonant clock domains. Inductors connect to respective pairs of resonant clock domains at respective boundaries between the respective pairs of resonant clock domains.

In an embodiment a non-transitory computer-readable medium stores a computer readable data structure encoding a functional description of an integrated circuit. The integrated circuit includes a first resonant clock domain of a resonant clock network coupled to a second resonant clock domain of the resonant clock network by a clock mesh branch. A clock driver associated with the first clock domain supplies a clock signal to the first clock domain; and an inductor connected to the clock mesh branch at a boundary between the first and second resonant clock domains.

BRIEF DESCRIPTION OF THE DRAWINGS

The embodiments disclosed herein may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
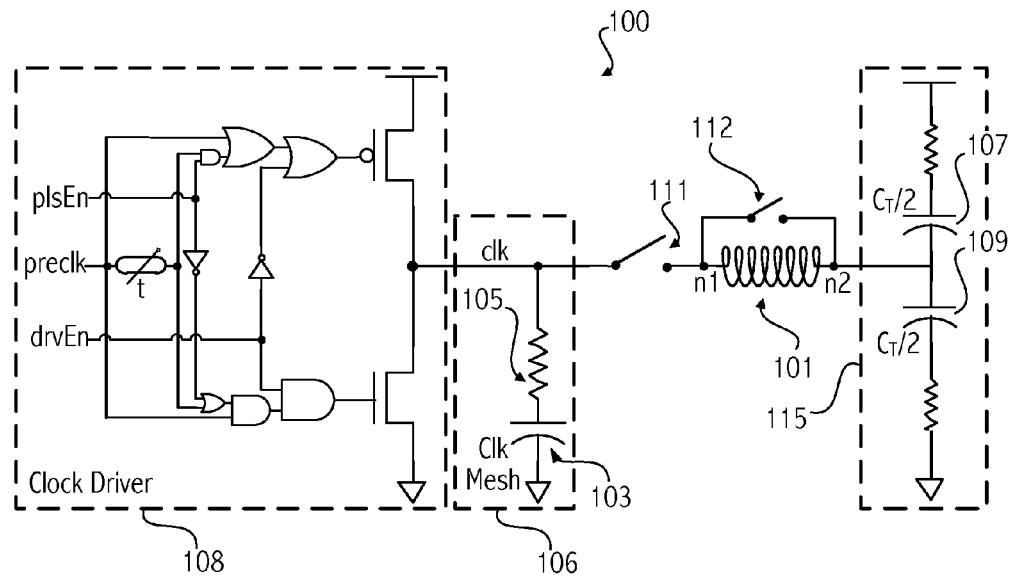
FIG. 1 illustrates a simplified model of a dual mode clocking system which supports both resonant and conventional clocking, according to some embodiments.

FIG. 1 illustrates a simplified model of a portion of a resonant clock system 100. A distinctive feature of the resonant clock system or network 100 is the use of an inductance 101, which may be implemented, e.g., as an on-chip spiral inductor, and is connected in parallel with the parasitic capacitance 103 of the resonant clock system 100 shown in a clock mesh 106. The inductance 101 allows the energy that is stored in the parasitic capacitance 103 to be used by the clock mesh 106 by forming an LC resonant circuit. A driver 108 drives the clock signal for the clock mesh 106. The role of the driver 108 in the resonant mode is to replenish only the energy lost in the parasitic resistance 105 of the LC system. Resonant clocking thus relies on efficient LC resonance to achieve energy efficiency. For an ideal inductor and interconnect, with no parasitic resistance, the clock system 100 would oscillate with zero energy dissipation. Resonant clocking is most efficient at frequencies close to the resonant frequency.

Capacitors 107 and 109 may be included to ensure that the n2 node is connected to ground (or VDD) in an AC sense. That avoids a DC drop across the inductor (which would lead to current buildup) so that n2 takes on the natural DC value of the clock signal, and at the same time provides a very low impedance at the resonant frequency so that the inductor 101 and the clock mesh load look like a parallel LC tank circuit, with the capacitors 107 and 109 appearing like ground connections.

Switch 111 may be opened to remove the inductor from the clock network when operating in a non-resonant mode of operation. Switch 111 is closed in resonant mode of operation. Switch 112 may be closed on switching from resonant mode to non-resonant mode.

Figure 2:
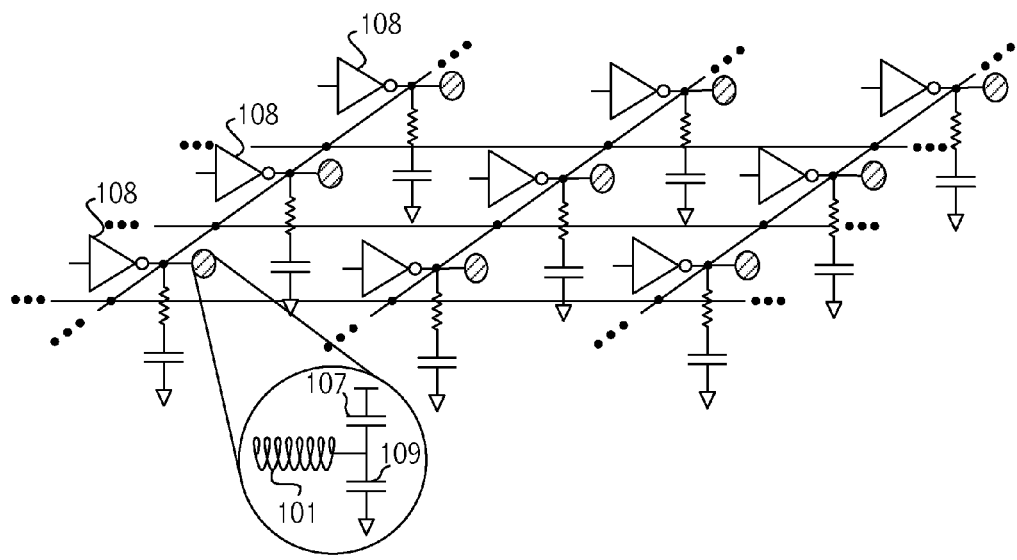
FIG. 2 illustrates a distributed array of inductors to efficiently achieve LC resonance with distributed clock load, according to some embodiments.
Figure 3:
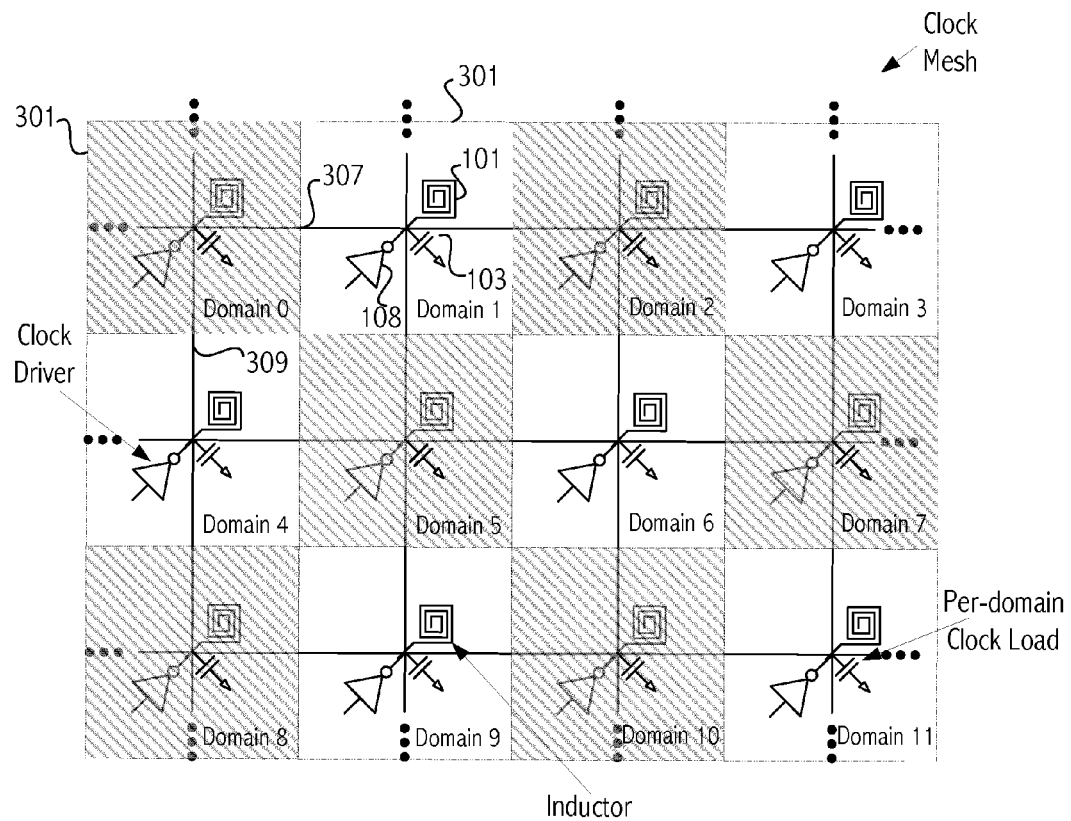
FIG. 3 illustrates clock drivers driving a clock mesh, according to some embodiments.

In implementations of resonant clocking, the clock capacitance often takes the form of a clock mesh with attached loading. In implementations of conventional clocking, multiple drivers are distributed across the mesh so that each driver can effectively drive the clock load in its clock "domain." As used herein, clock domain refers to localized regions of the clock mesh. Similarly, for a resonant clocked system, multiple inductors are distributed across the clock mesh to achieve efficient LC resonance. The clock drivers of such domains may share a common input source clock, be on the same voltage supply, and oscillate at the same frequency. Conceptually, each inductor can be thought of as achieving LC oscillation with the capacitive loading in its neighborhood or domain. Since the load is well connected, these well connected resonant clock "domains" all oscillate in phase. FIG. 2 shows an example clock mesh with such a distributed arrangement with the inductor 101 and capacitors 107 and 109 distributed with the individual clock drivers 108. FIG. 3 illustrates this implementation from another perspective. Each of the resonant clock domains 301 has an associated driver 108, inductor 101, and capacitance 103. Note that the resonant clock domains are shown in a checkerboard pattern for ease of illustration. The inductors achieve LC resonance with the capacitive clock load in the localized regions around it, resulting in interconnected resonant clock domains.

The amount of capacitive load in a clock domain may vary significantly from one clock domain to the next. For a conventional clock networks, the clock drivers that drive the clock mesh may be fine-tuned to drive the specific load in their clock domain so that current flow in the clock mesh branches is minimized so as to achieve a low skew clock distribution. That is, current flow is localized to a particular clock domain rather than flowing in the clock mesh branches to supply current to another domain. In a resonant clock network, both the driver and the inductors may need to be fine-tuned to drive the load in each individual resonant clock domain. Unlike clock drivers, which can be fine-tuned to drive the clock load in its own resonant clock domain in order to achieve manageable clock skew, designing a large variety of inductors is often untenable and this results in inductors that are not exactly suited to the clock load of each resonant clock domain. In some embodiments, the drive strength of a clock driver can be varied based on a configuration setting.

Figure 4:
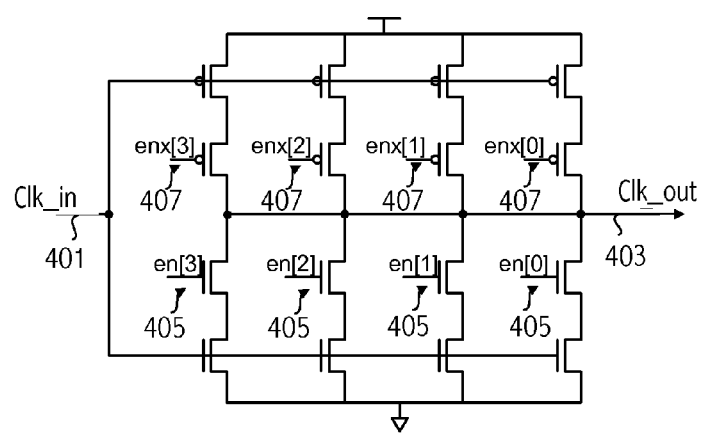
FIG. 4 illustrates an embodiment in which inductors share clock domains to mitigate the impact of inductor mismatch, resulting in reduced clock skew, according to some embodiments.

FIG. 4 illustrates a simple example of a configurable clock driver, according to some embodiments. By applying a configuration setting (en[3:0]), a desired drive strength can be applied to each driver. A clk-in signal is received on node 401. The number of transistor pairs turned on by the enable signals en[3:0] determines the drive strength of the clk_out signal supplied on node 403. The en[3:0] signals provide the configuration settings for the NMOS devices 405 and the enx[3:0] provide the configuration settings for the PMOS devices 407. In general, a wide range of driver configurability is available. During design, the load associated with the domain in which the driver resides can be used to set the drive strength of the driver. That drive strength may be programmable at run-time.

A problem facing inductor design in resonant clocking applications is the inability to predict inductance accurately at design time, and the difficulty in implementing an inductance that does not vary during operation. Integrated inductors are often instantiated in a controlled noise-free environment so that their electrical properties can be modeled with sufficient accuracy, and do not change during the operation of the system. In a resonant clocking application however, the inductors are instantiated in a noisy digital environment, with signal routes and power grids placed underneath. Such a noisy environment not only results in significant inaccuracies in modeling the inductor, but also can result in the inductance of the inductor varying during operation. In addition, designing multiple inductors, each suited to the loading in its domain is infeasible given the time and complexity of inductor design. As such, only a few discrete choices of inductors are available to service an entire range of clock loads, leading to "quantization-error" at design time itself.

In an ideal clock mesh, the clock mesh branches do not carry much current since the amount of current required in each clock domain is supplied by the clock driver output and inductor connection of the clock domain. The clock driver can be designed to have an appropriate drive strength to provide a current suitable for its load and the current is primarily consumed by its load rather than being carried on the clock mesh branches. However, the inductor design is more problematic. Due to the inability to design an inductor precisely for the clock load in each resonant clock domain, and potentially varying inductance during operation, the clock mesh branches carry current between resonant clock domains to compensate for the mismatch between an actual inductance and a desired inductance. For example, referring to FIG. 3, clock mesh branches 307 and 309 may carry current from domain 0 to domains 1 and 4, respectively. Thus, a resonant clock domain with too large an inductor "drives" some of the load in adjacent resonant clock domains. The low resistance of the clock mesh branches is not enough to avoid the resulting global clock skew impact, however, and therefore the limitations in inductor design pose a significant clock skew challenge to resonant clocked designs. Global clock skew causes clocks in different resonant clock domains to be at different phases with respect to the global clock, which can negatively affect timing margins for circuits.

One solution to avoid having mismatched inductors negatively affect clock skew is to provide an inductor that is well matched to the load in the particular resonant clock domain. That would require building as many inductors as there are unique resonant clock domains. However, such a solution is both impractical and insufficient, however, since a modern microprocessor can have hundreds of resonant clock domains and designing each inductor is an intensive process. In addition, the inductance of the windings will change depending on the noise in the digital environment around it, and this causes significant balancing currents in the clock mesh branches, resulting in clock skew.

An embodiment addresses the disadvantages of the various potential solutions described above by reducing the clock skew that results due to the inaccuracies in the inductor for each domain, both at design time and at run time.

Figure 5:
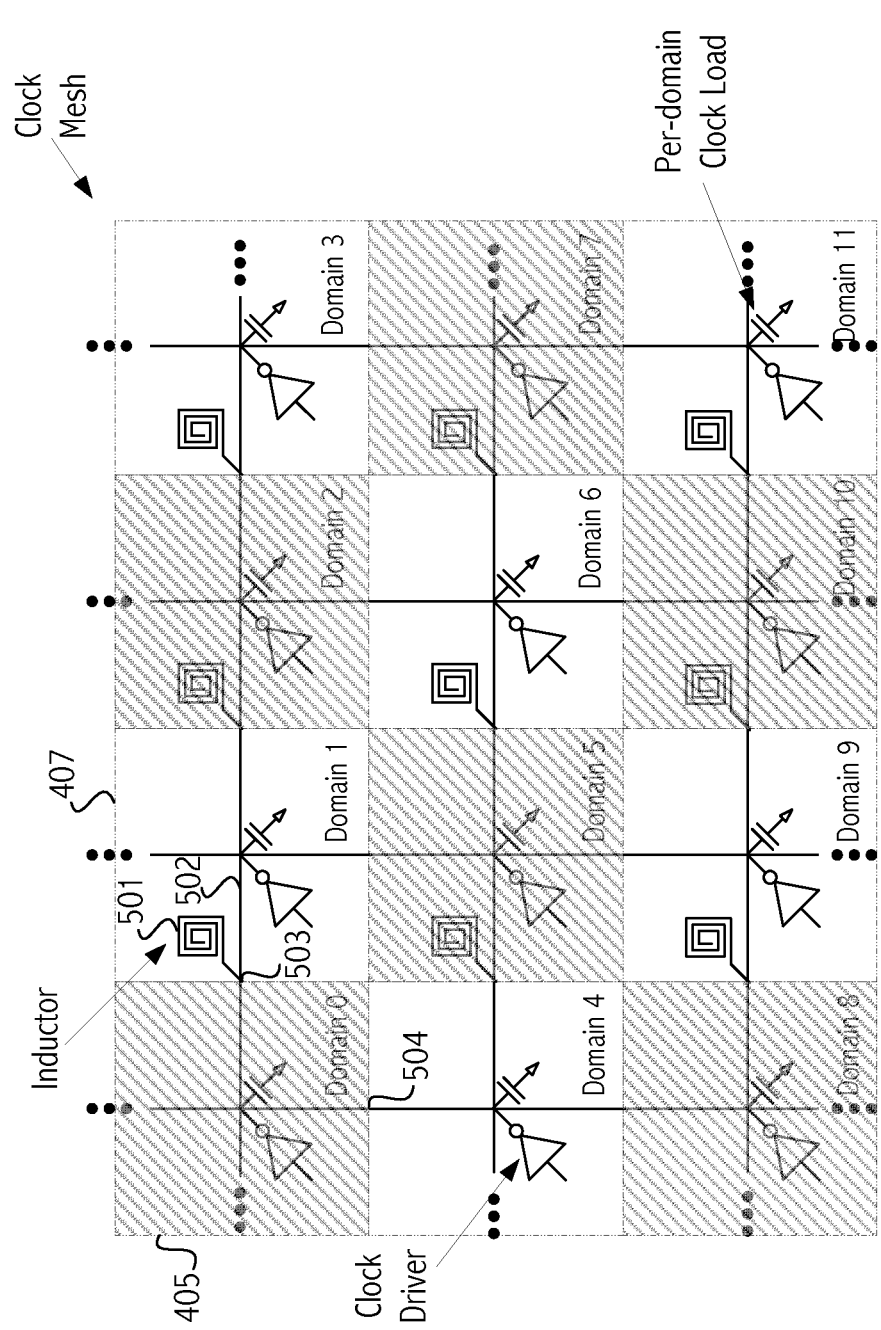
FIG. 5 illustrates inductor connections, according to some embodiments.

FIG. 5 illustrates an example embodiment addressing problems associated with inductor design. In some embodiments, instead of connecting the inductor to the driver output as in FIG. 3, which effectively assigns an inductor to each resonant clock domain, the inductor is connected to the clock mesh branches at the boundary between two resonant clock domains, allowing for each inductor to be shared between these resonant clock domains. For example, inductor 501 is connected to the clock mesh branch 502 at the boundary 503 between resonant clock domains 405 (Domain 0) and resonant clock domain 407 (domain 1). In some embodiments, the inductor 501 is connected to the clock mesh branch 504 at the boundary between resonant clock domain 0 and resonant clock domain 4, thus allowing resonant clock domains 0 and 4 to share the inductor. The resistance between the inductor winding and the clock load attached to the neighboring domain is effectively halved, reducing the skew impact of the current flow between resonant clock domains through the clock mesh branches that connect the resonant clock domains.

Thus, placing the inductor at the boundary of the clock domains results in mitigation of clock skew in resonant clocked designs arising from the inability to accurately model the inductance connected to each resonant clock domain at design time. Further, by tolerating mismatch between an inductor and the resonant clock domain connected to it, the various resonant clock domains in a resonant clock network can be serviced by a much smaller palette of inductor sizes, substantially simplifying the implementation of a resonant clocked system. In addition, placing the inductor as shown in FIG. 5 mitigates the clock skew caused by runtime changes in inductance caused by the noisy digital environment, or other effects such as temperature. That placement also mitigates design time inductor mismatch with load resulting from the limitations in the number of unique inductors.

Moving the inductor from the resonant clock domain 0 clock driver to the intersection between resonant clock domain 0 and resonant clock domain 1, causes increased resistance for current going to circuits in domain 0. That increased resistance may slightly increase skew, but a majority of skew results from mismatched inductors, and therefore from current having to flow from a neighboring resonant clock domain. By effecting an averaging by placement of the inductor between resonant clock domains, there may be an increase in delay in any domain but the difference between the resonant clock domains is diminished because less current has to flow from a neighboring resonant clock domain. Thus, overall skew is improved.

While circuits and physical structures have been generally presumed in describing embodiments of the invention, it is well recognized that in modern semiconductor design and fabrication, physical structures and circuits may be embodied in a computer readable medium as data structures for use in subsequent design, simulation, test, or fabrication stages. For example, such data structures may encode a functional description of circuits or systems of circuits. The functionally descriptive data structures may be, e.g., encoded in a register transfer language (RTL), a hardware description language (HDL), in Verilog, or some other language used for design, simulation, and/or test. Data structures corresponding to embodiments described herein may also be encoded in, e.g., Graphic Database System II (GDSII) data, and functionally describe integrated circuit layout and/or information for photomask generation used to manufacture the integrated circuits. Other data structures, containing functionally descriptive aspects of embodiments described herein, may be used for one or more steps of the manufacturing process.

Computer-readable media include tangible computer readable media, e.g., a disk, tape, or other magnetic, optical, or electronic storage medium. In addition to computer-readable medium having encodings thereon of circuits, systems, and methods, the computer readable media may store instructions as well as data that can be used to implement embodiments described herein or portions thereof. The data structures may be utilized by software executing on one or more processors, firmware executing on hardware, or by a combination of software, firmware, and hardware, as part of the design, simulation, test, or fabrication stages.

The description of the embodiments set forth herein is illustrative, and is not intended to limit the scope of the invention as set forth in the following claims. For example, embodiments of the invention are not limited in scope to microprocessors. Rather, the solution described herein applies to integrated circuits in general, where resonant clocking is used. Other variations and modifications of the embodiments disclosed herein may be made based on the description set forth herein, without departing from the scope of the invention as set forth in the following claims.

What is claimed is:

1. An integrated circuit comprising:
a resonant clock network having a plurality of resonant clock domains formed in a grid pattern;
a first resonant clock domain of the plurality of resonant clock domains disposed as a first section of the grid pattern adjacent to a second resonant clock domain of the plurality of resonant clock domains disposed as a second section of the grid pattern;
a clock mesh branch crossing a boundary between the first and second resonant clock domains and coupling a first clock driver of the first resonant clock domain and a second clock driver of the second resonant clock domain; and
an inductor connected to the clock mesh branch at the boundary between the first resonant clock domain and the second resonant clock domain, the boundary being a common edge of the first section and the second section.

2. The integrated circuit as recited in claim 1, further comprising:
a plurality of other inductors each connected at respective boundaries between respective pairs of resonant clock domains.

3. The integrated circuit as recited in claim 1 wherein the first clock driver is configured according to a load of the first resonant clock domain.

4. The integrated circuit as recited in claim 1 wherein the resonant clock network is configured to operate in a resonant mode of operation.

5. The integrated circuit as recited in claim 1 wherein the first resonant clock domain is comprised of circuits configured to receive a first portion of a first clock signal from the first clock driver and a second portion of the first clock signal from an LC circuit formed from the inductor and capacitance in the first and second resonant clock domains.

6. The integrated circuit as recited in claim 5,
wherein the first clock driver is configured to supply a majority of its current associated with the first clock signal to the first clock domain.

7. The integrated circuit as recited in claim 6 wherein the second resonant clock domain is comprised of circuits configured to receive a first portion of a second clock signal from the second clock driver and a second portion of the second clock signal from the LC circuit formed from the inductor and capacitance in the first and second resonant clock domains.

8. The integrated circuit as recited in claim 7 wherein the second clock driver is configured to supply a majority of its current to the second clock domain.

9. The integrated circuit as recited in claim 1 wherein the first clock driver is connected to the first resonant clock domain at a central location of the first section and the second clock driver is connected to the second resonant clock domain at a central location of the second section.

10. The integrated circuit as recited in claim 1 wherein the inductor is connected at the common edge of the first and second sections to thereby be equidistant from respective first and second clock loads of the first and second resonant clock domains.

11. A method in a resonant clock network having a plurality of resonant clock domains formed in a grid pattern, the method comprising:
supplying a first portion of a first clock signal to circuits of a first resonant clock domain of the plurality of resonant clock domains from an inductor and supplying a portion of a second clock signal to circuits of a second resonant clock domain of the plurality of resonant clock domains from the inductor, which is connected at a boundary marking a common edge between the first resonant clock domain forming a first section of the grid pattern and the second resonant clock domain forming a second section of the grid pattern adjacent to the first section.

12. The integrated circuit as recited in claim 11 further comprising operating the resonant clock network in a resonant mode of operation.

13. The method as recited in claim 11 further comprising supplying a second portion of the first clock signal from a first clock driver associated with the first resonant clock domain.

14. The method as recited in claim 13 wherein the first clock driver is configured according to a load of the first resonant clock domain.

15. The method as recited in claim 13 further comprising supplying a portion of the second clock signal to the second resonant clock domain from a second clock driver associated with the second resonant clock domain.

16. The method as recited in claim 15 wherein the second clock driver is configured according to a load of the second resonant clock domain.

17. The method as recited in claim 11, further comprising:
supplying a second portion of the second clock signal to the second resonant clock domain of the resonant clock network and a third resonant clock domain of the resonant clock network from a second inductor connected at a second boundary between the second resonant clock domain and the third resonant clock domain, the second boundary being an edge common to the second section and a third section of the grid pattern formed by the third resonant clock domain.

18. The method as recited in claim 17 wherein the second inductor forms an LC circuit including parasitic capacitance in the second and third resonant clock domains.

19. The method as recited in claim 11 wherein the inductor forms an LC circuit including parasitic capacitance in the first and second resonant clock domains.

20. An integrated circuit comprising:
a plurality of resonant clock domains of a resonant clock network formed in a grid pattern;
respective clock drivers associated with respective ones of the resonant clock domains, each of the resonant clock domains forming a section of the grid pattern, each clock driver supplying respective first portions of respective clock signals to an associated resonant clock domain of the of the plurality of resonant clock domains; and
respective inductors connected to respective pairs of resonant clock domains at respective clock mesh branches coupling the respective pairs of resonant clock domains at respective boundaries between the respective pairs of resonant clock domains, the respective boundaries forming respective common edges of the grid pattern for the respective pairs of resonant clock domains.

21. The integrated circuit as recited in claim 20 wherein the respective clock drivers are configured according to respective loads of their associated resonant clock domains.

22. The integrated circuit as recited in claim 20 wherein the resonant clock network is configured to operate in a resonant mode of operation.

23. The integrated circuit as recited in claim 20 wherein the inductors supply current in the resonant mode of operation that augments the respective clock signals supplied by the clock drivers.

24. The integrated circuit as recited in claim 20 wherein the respective inductors form respective LC circuits with capacitance in respective pairs of resonant clock domains.

25. A non-transitory computer-readable medium storing a computer readable data structure encoding a functional description of an integrated circuit, the integrated circuit comprising:
a first resonant clock domain of a resonant clock network coupled to a second resonant clock domain of the resonant clock network by a clock mesh branch, wherein the resonant clock network is formed in a grid pattern and the first and second resonant clock network are adjacent sections of the grid pattern;
a first clock driver associated with the first resonant clock domain to supply a portion of a first clock signal to the first resonant clock domain;
a second clock driver associated with a second resonant clock domain of the resonant clock network to supply a portion of a second clock signal to the second resonant clock domain; and
an inductor connected to the clock mesh branch at a boundary between the first and second resonant clock domains and the inductor forming an RC network with capacitance in the first and second resonant clock domains, the inductor to supply respective portions of the first and second currents, the boundary being a common edge between the adjacent first and second sections of the grid pattern.

* * * * *

UNITED STATES PATENT AND TRADEMARK OFFICE
CERTIFICATE OF CORRECTION

PATENT NO.       : 8,975,936 B2
APPLICATION NO.  : 13/601119
DATED            : March 10, 2015
INVENTOR(S)      : Sathe et al.

It is certified that error appears in the above-identified patent and that said Letters Patent is hereby corrected as shown below:

In the Claims

Claim 20, line 9, delete "of the".

Signed and Sealed this
Ninth Day of June, 2015

Michelle K. Lee
*Director of the United States Patent and Trademark Office*